Oct. 25, 1938.   A. MUNOZ   2,134,413
FILTER ASSEMBLY
Filed May 20, 1937
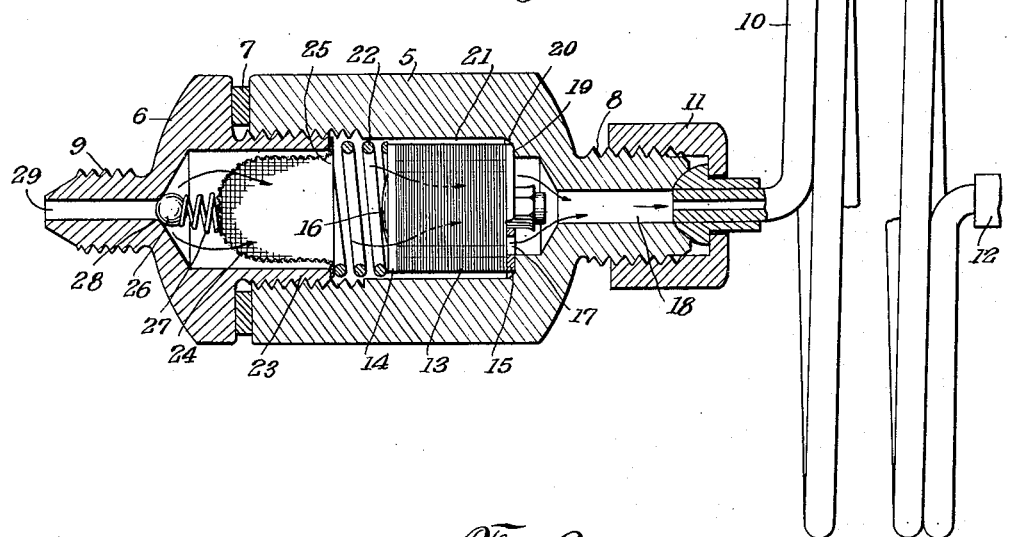
ALFRED MUNOZ
INVENTOR
BY Philip S. McGean
ATTORNEY Patented Oct. 25, 1938

2,134,413

UNITED STATES PATENT OFFICE 2,134,413

FILTER ASSEMBLY

Alfred Munoz, Brooklyn, N. Y.

Application May 20, 1937, Serial No. 143,661

6 Claims. (Cl. 210—166)

The invention here disclosed relates to filters of the type employed in mechanical refrigerator systems.

Objects of the invention are to provide a filter assembly of simple inexpensive construction, consisting of but few, easily assembled parts; which will serve without attention over long periods of use and which when required may be readily taken apart and easily cleaned; which may when required be used in the capacity of a check valve as well as filter and which further, if desired, may be employed as a unit for restricting and smoothing the flow of the chemical employed as the refrigerant.

The foregoing and other desirable objects are attained in this invention by the novel features of construction, combinations and relations of parts hereinafter described, illustrated and broadly claimed.

The drawing accompanying and forming part of the following specification illustrates several practical commercial embodiments of the invention, but these are primarily illustrative in character, it being appreciated that changes and modification in structure may be made within the true spirit and scope of the invention as hereinafter defined and claimed.

Fig. 1 is a broken longitudinal sectional view of one of the filter assemblies.

Fig. 2 is a broken part sectional detail of another embodiment.

Fig. 3 is a similar view of a further modification.

The shell or casing of the filter is shown as made up as a hollow body member 5, and a tubular cover 6, screwed into the open end of the same with a lead gasket or other suitable seal, such as indicated at 7. These body and cover portions are shown as having screw nipples 8, 9, by which the filter may be connected in line with the evaporator and condenser elements of the reflector system.

In the present illustration, Fig. 1, a coil of capillary tubing 10, is directly connected with and made a part of the filter by the coupling 11, engaged with screw nipple 8, said coil carrying at its opposite end a similar coupling 12, or equivalent by which the latter end of the coil may be connected in the line leading to the evaporator.

The filter element is indicated at 13, as a stack of washers or discs spaced to admit the liquid being filtered, the filter leaves thus provided being confined between end plates 14, 15, loosely held together by a rivet or stud 16, headed over at opposite ends.

The end plate 15, of the filter element has a passage or passages 17, to pass filtered liquid from inside the filter pile into the outlet channel 18. This washer seats flat against a shoulder 19, and is guided thereto by a rounded or tapered seat 20, leading from the larger, chamber portion 21, in the body to said shoulder.

A helical spring is indicated at 22, for holding the loosely retained pile of filter washers firmly together, said spring bearing against the opposite closed end plate 14, and supported at its opposite end by the inner end of the annular screw neck portion 23, of the cap 6.

To protect the fine leaf filter from heavier particles and to prevent it from becoming clogged with accumulated matter, there is provided in the illustration Fig. 1, a thimble screen 24, having a flange 25, interposed between the end of the cap sleeve and the adjoining end of the spring 22. This screen, like the filter element, is spaced from the surrounding portions of the casing structure, so as to provide ample exposed straining or filtering surface.

A back pressure valve is incorporated in the filter structure in the present disclosure as a ball check 26, held by spring 27, against the bevelled check valve seat 28, at the inner end of the inlet passage 29, in the cover nipple 9.

In the Fig. 1 form of construction, the check valve spring 27, is shown as a short tapered coil spring interposed between the ball valve 26 and the adjoining end of the thimble screen.

In constructions where the screen may not be considered as a necessary or desirable adjunct or guard for the edge filter element, a single spring may be employed for holding the pile compressed and for thrusting the check valve to its seat. Such a construction is illustrated in Fig. 2, where a larger and longer coiled taper spring 27a is illustrated interposed directly between the end plate 14 of the filter and the check ball valve 26.

For some purposes, both the check valve and the screen may be considered unnecessary or undesirable and in such events, both the screen 24 and the check valve 26, may be omitted and a spring such as 22, in Fig. 1, be interposed between the filter pile and end cap of the casing for simply holding the filter pile firmly in position in the casing.

The use of the screen as a guard for the filter is particularly desirable for old refrigeration systems, where there may be considerable foreign matter in the refrigerant.

This construction then by straining out and keeping loose matter from reaching the filter, enables a filter of standard size to be used where otherwise it might be necessary to employ an oversize filter assembly.

The filter assembly may be readily taken apart by simply unscrewing the cap 6. This gives access to all interior parts, enabling the filter pile to be taken out, loosened and cleaned and the screen, if present, to be washed clean and similarly the check valve, also if present, to be removed and cleaned as may be necessary.

The association of check valve, screen, filter, pile and capillary tube, while desirable and cooperative in a complete assembly, is not essential, for as can be realized, one or more of such coacting elements may be eliminated and the structure still have commercial value. The check valve when the machine shuts down, holds pressure and prevents back rush of liquid through the capillary tube, thus maintaining the system at all times in better operating condition.

The parts are few and of simple sturdy design, inexpensively manufactured and easily assembled or readily taken apart. The tapered extension leading to the seat for the filter pile enables the filter element to be readily centered by simply dropping it into the casing, after which the force of the spring holds it in this centered relation with space all around for the liquid being filtered. The connection of the capillary coil directly to the end of the outlet nipple makes this coil in substance an integral part of the assembly, ready to be installed in the line between the evaporator and condenser, bracing and supporting this coil of light tubing in such relation.

To protect the check valve from matter which might hold it open, this valve may be located behind instead of in front of the screen, for example, between the screen and the filter pile, or as indicated in Fig. 3, in back of the filter pile, as by locating it in the outlet nipple of the casing. In this relation, the liquid is strained before it reaches the check valve.

The flange of the screen may be in the form of a ring, such as indicated at 30, Fig. 3, fitting into an annular seat 31, in the cover. This ring is shown as having shoulder 32, providing a seat for the end of the spring. This construction firmly locates the parts in their proper relations. Expansible spring washers of non-corrosive metal may be used in place of the coiled springs shown and which usually are of steel and hence corrosible in certain of the refrigerant liquids now employed. The securing of the filter leaves in loosely assembled relation and using the spring to hold them closely assembled and properly seated in the filter chamber is advantageous from the manufacturing standpoint, also for assembling and particularly important for enabling quick cleaning. So far as known, the construction provides the first separable readily cleanable filter for refrigerators, taking the place of the larger and more bulky non-separable filters made up of layers of felt and metallic screen in a two part shell, secured by a soldered joint. In cases where expansion valve is used instead of the capillary tube illustrated, the filter casing may be connected directed to the expansion valve or the filter unit be built in as a part of the expansion valve. The edge type filter element in conjunction with the expansion valve is much more efficient than the usual wire cloth screens heretofore employed in connection with expansion valves.

What is claimed is:

1. A refrigeration filter comprising a casing having a filter chamber and a tapered extension from said chamber to a seating shoulder, a filter pile comprising a stack of filter leaves loosely retained between end plates, one end plate of a size to be guided by said tapered extension to said seating shoulder, said casing having a cover with an annular screw stem opposed to the opposite end of the seated filter pile and a spring interposed between said screw stem and the opposite end plate of the filter pile.

2. A combination as in claim 1, with a screen having a flange interposed between the end of said screw stem and the adjoining end of said filter pile retaining spring.

3. A combination as in claim 1, with a screen having a flange interposed between the end of said screw stem and the adjoining end of said filter pile retaining spring, a check valve within the cover and a check valve closing spring having a bearing against said screen.

4. A combination as in claim 1, in which the casing has an entrance with a check valve seat and in which a spring closed check valve cooperates with said seat.

5. A combination as in claim 1, with a spring closed check valve at one end of the casing and a capillary tube connected with the opposite end of the casing.

6. A filter unit, comprising a casing having a screw cover provided with a check valve seat, said casing having a seat opposite said check valve seat, a pile of loosely retained filter leaves engaged at one end with said casing seat, a ball valve engaged with the check valve seat in the cover and a spring interposed between said ball valve and the adjoining end of the filter pile.

ALFRED MUNOZ.